United States Patent [19]

Wright, III

[11] Patent Number: 4,978,261

[45] Date of Patent: Dec. 18, 1990

[54] QUILL STOP

[76] Inventor: Charles O. Wright, III, 6 Shannon Ct., Oxford, Conn. 06483

[21] Appl. No.: 447,945

[22] Filed: Dec. 8, 1989

[51] Int. Cl.$^5$ .................. B23Q 21/00; F16B 37/08
[52] U.S. Cl. .................. 409/218; 408/241 S; 411/433
[58] Field of Search .......... 411/433; 409/218; 408/241 S

[56] References Cited

U.S. PATENT DOCUMENTS

| | | | |
|---|---|---|---|
| 2,736,227 | 2/1956 | Stroble | 411/433 |
| 4,048,897 | 9/1977 | Price, Jr. | 411/433 |
| 4,132,146 | 1/1979 | Uhlig | 411/433 |
| 4,521,144 | 6/1985 | Ginter | 409/218 |
| 4,693,656 | 9/1987 | Guthrie | 408/241 S X |

FOREIGN PATENT DOCUMENTS 830717  2/1952  Fed. Rep. of Germany ...... 411/433

*Primary Examiner*—William Briggs
*Attorney, Agent, or Firm*—S. Pal Asija

[57] ABSTRACT

This invention relates to an improved gadget and method for the relative positioning and locking of a first externally threaded device with respect to a second device. The gadget includes a means for translating garduated markings around the outside circumference into longitudinal movement. The use of this device with ½" 20 thread size on the quill of a Bridgeport type milling machine to accurately control the movement limitation of the quill is described as an example.

7 Claims, 2 Drawing Sheets

QUILL STOP

SUMMARY

This invention relates to an improved precision quill stop device which can be quickly installed and removed. A prior art search was conducted and the closest prior art found was quill stop device by Ginter, U.S. Pat. No. 4,521,144 dated Jun. 4, 1985. Even this device frictionally fits on quill spindle and therefore does not permit precision depth control.

The improved quill stop device which is a precision relative positioning and locking device of this invention, permits precision bi-directional quill depth control because it has internal helixal longitudinal threads which lock onto externally threaded quill spindles in Bridgeport type milling machines.

Furthermore, Ginter device uses clamp ring-clip 14 and set screw 18 to position it to quill spindle whereas the Wright invention locks on automatically to an OEM (original equipment manufacturer) shaft without any tools or settings.

Another improvement over Ginter is incorporation of graduated markings on the outside circumference to show and control longitudinal movement.

Another improvement over Ginter is that Wright invention has more strength to resist quill movement and more durability and holding power so that the device cannot accidentally pop off even after extended use.

Some other prior art relative positioning devices or quill stop applications are fixed and not removable. They waste many hours of precious skilled labor time by requiring of necessity rotation of a non-removable nut along the entire length of the device incorporating external threads.

It is an object of this invention that this gadget be quickly and easily removable from the externally threaded device.

Another object of this invention is that it provides a precision and accurate method of locating another device with respect to the externally threaded device incorporating this invention.

Another objective of this invention is that it be small, lightweight, portable and affordable such that individual mechanics and machinists can readily use it without any aggravation, experimentation and training.

Another specific objective of this invention is that it can be quickly used, installed and removed on the quill of a Bridgeport type milling machine to accurately control the movement limitation of a quill.

Another specific objective of this invention is that it has 360 degree movement.

Another specific objective of this invention is that is encompasses graduated markings around the outside circumference to indicate longitudinal movement.

Another objective of this invention is that it can be retrofitted for use in relative positioning of a wide variety of devices having external threads.

Other objects of this invention reside in its simplicity, strength, modularity and design asthetics as will become apparent from the following detailed description of the preferred embodiment.

DETAILED DESCRIPTION OF THE PREFERRED EMBODIMENT

Figure 1:
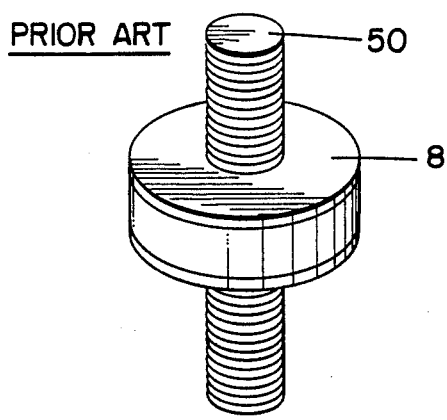
FIG. 1 is a perspective view of the prior art quill stop device.
Figure 2:
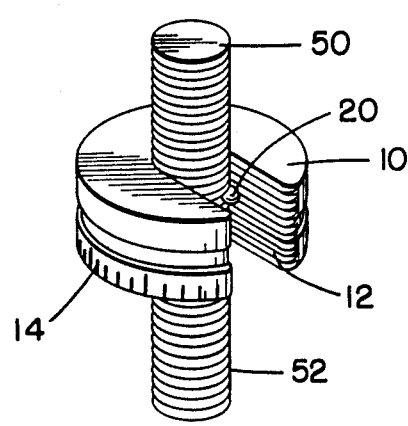
FIG. 2 is a perspective view of the relative positioning and locking quill stop device of this invention.
Figure 3:
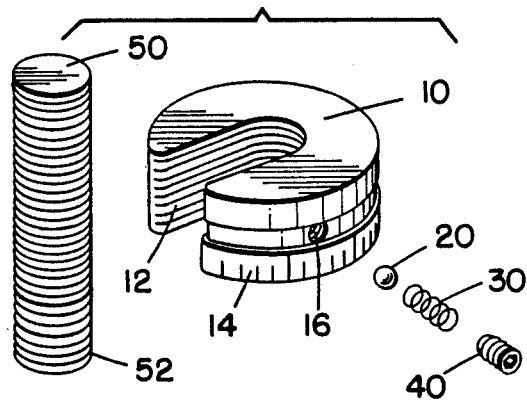
FIG. 3 is an exploded view of the invention vis-a-vis externally threaded quill spindle prior to installation.
Figure 4:
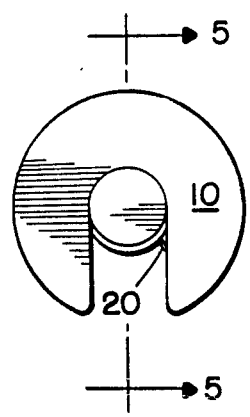
FIG. 4 is a top view of the thread stop relative positioning and locking devise of this invention.
Figure 5:
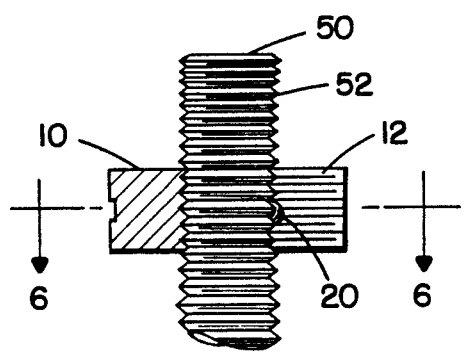
FIG. 5 is a half sectional side view from lines 5—5 of FIG. 4.
Figure 6:
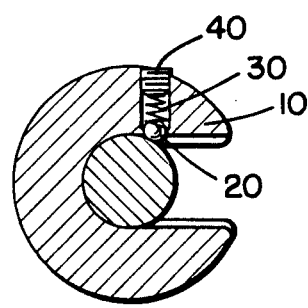
FIG. 6 is a view from lines 6—6 in FIG. 5.
Figure 7:
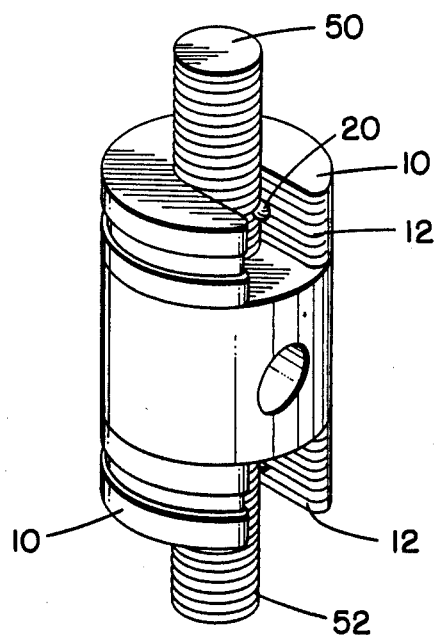
FIG. 7 is a perspective view of 2 identical devices mounted on quill spindle indicating stop points in both vertical directions.

The improved quill stop device of this invention comprises a round piece 10 having a plurality of helix longitudinal threads 12 all along a "U" shaped cut out in said round piece 10 and graduated scale 14 along outside circumference of said round piece 10. The device also comprises a plunger ball 20, a spring 30, and a screw 40, inserted into a drilled tapped and threaded hole 16 in said round piece 10.

The following steps are recommended for the practice of the preferred embodiment.

1. Cut a flat half inch thick round piece from a round bar of material.
2. Using a CNC (Computerized Numerical Control) lace, face drill and form graduated designations (for example 0.001 inch) along one circumference of said round piece 10 and form diamond knurles along second circumference of said round piece 10.
3. Chamfer 45 degree edge breaks and cut off to length to form a U shaped cutout.
4. Drill and tap a threaded hole while clamping said round piece 10 in a fixture.
5. Clamp the round piece 10 in a fixture on a CNC machining center to machine form internal elongated helix longitudinal threads along said U shaped cutout.
6. Debur, clean and finish (such as satin chroming) on said round piece 10.
7. Insert plunger ball, spring and screw into said drilled and tapped threaded hole and adjust said screw to desired tension.

USE

The device is used by popping on and off said device onto a quill spindle at desired position on top for back spot facing, on the bottom for regular drilling or milling and both on top and bottom for rough and finish milling. To pop on, simply hold said quill stop device with thumb and index finger over the knurled portion, then face U shaped cutout towards the quill spindle and push it until it clicks, snaps on and/or snugly fits to the end. To reposition and to pop off, use the reverse procedure.

Following is a listing of the elements used in the preferred embodiment arranged in ascending order of the referred numerals:

8. Prior Art Quill Stop Device.
10. Improved Quill Stop Device of this invention.
12. Longitudinal Helix thread along U shaped cut out.
14. Graduated markings along 1st circumference of said device 40.
16. Hole in said device 10.
18. Knurles along 2nd circumference of said device.
20. Plunger ball.
30. Spring.

40. Screw.

50. Quill spindle.

52. External threads on said Quill spindle 50.

Having thus described the invention, the inventor recognizes that many changes may be made to this without deviating from the spirit of this invention. Following are a few examples of such anticipated modifications:

1. Newer materials may be used as they become available.

2. Different finishes may be used for aesthetic appearance.

3. A different process may be used to encompass and manufacture comparable embodiment.

4. Minor variations may be made without deviating from the easy pop on-pop off procedure which is an essential benefit and characteristic of this invention.

Accordingly, the inventor claims as follows:

1. An improved quill stop device comprising:
   a. a round piece having a U shaped opening having parallel sides and a semi-circular connecting area;
   b. longitudinal helical threads formed along said U shaped opening including said sides of said round piece; and
   c. means extending into said opening along a said side for attaching said round piece to an externally threaded shaft of a quill of a Bridgeport type milling machine.

2. An improved quill stop device of claim 1 wherein further there are incorporated graduated markings along one circumference of said round piece and knurles along second circumference of said round piece.

3. An improved quill stop device of claim 2 wherein said means for attaching said round piece to an externally threaded shaft of a quill comprises:
   a. a plunger ball inserted into said round piece 10 via a bore drilled for this purpose;
   b. a spring inserted behind said plunger ball; and
   c. a screw inserted behind said spring.

4. An improved quill stop device of claim 3 wherein said plunger ball, spring and screw are inserted in a bore which is transverse to said round piece.

5. An improved quill stop device of claim 4 wherein said bore is tapered narrow towards inside so that plunger ball protrudes into said U shaped opening but cannot fall off.

6. An improved quill stop device comprising:
   a. a round piece having a U shaped opening having parallel sides and a semi-circular connecting area and further incorporating longitudinal helical threads along said opening including said sides; and
   b. a plunger ball, a spring and a screw are inserted into a tapered bore in said U shaped round piece so that said ball extends into said opening along a said side.

7. An improved quill stop device for claim 6 wherein further there are incorporated graduated markings along one circumference of said round piece and knurles along second circumference of said round piece, and where in further said bore is transverse and tapered narrow inside such that the plunger ball protrudes into said U shaped opening but cannot escape.

* * * * *